United States Patent [19]

Masucci

[11] 4,257,041
[45] Mar. 17, 1981

[54] ELECTRO OPTICAL DISPLAY DEVICE

[75] Inventor: Carmine Masucci, Eastchester, N.Y.

[73] Assignee: Izon Corporation, New York, N.Y.

[21] Appl. No.: 916,740

[22] Filed: Jun. 19, 1978

[51] Int. Cl.³ .............................................. G06F 3/14
[52] U.S. Cl. .................................. 340/705; 340/718; 340/784; 340/380
[58] Field of Search ............... 340/705, 719, 718, 757, 340/765, 784, 380

[56] References Cited

U.S. PATENT DOCUMENTS

| 3,349,677 | 10/1967 | Young | 340/757 |
|---|---|---|---|
| 3,644,922 | 2/1972 | James et al. | 340/757 |
| 3,744,878 | 7/1973 | Kiemle et al. | 340/784 |
| 3,750,136 | 7/1973 | Roess | 340/784 |
| 3,909,823 | 9/1975 | Knowlton | 340/765 |
| 3,942,159 | 3/1976 | Minami | 340/757 |
| 3,963,326 | 6/1976 | Bochert | 340/757 |
| 4,103,297 | 7/1978 | McGreivy et al. | 340/719 |

Primary Examiner—Marshall M. Curtis
Attorney, Agent, or Firm—Daniel M. Rosen

[57] ABSTRACT

An electronically addressed electro optical display device of the type in which an electrical signal containing intelligence is translated into alphanumeric, graphic and pictorial images on an electro optical display includes an array of short focal length lenses, an array of electronically addressed electro optical display elements, each of which is aligned with and in the optical path of a respective one of the lenses and a screen onto which the images on the display elements are projected by the lenses. Where the electro optical display elements are of the passive type in which images are formed by selectively modulating the transmission, reflection or scattering of light, an array of light sources is employed located so as to illuminate the array of electro optical display elements.

13 Claims, 8 Drawing Figures

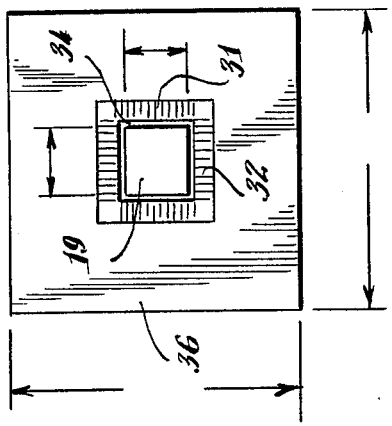
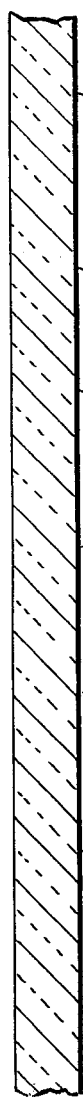
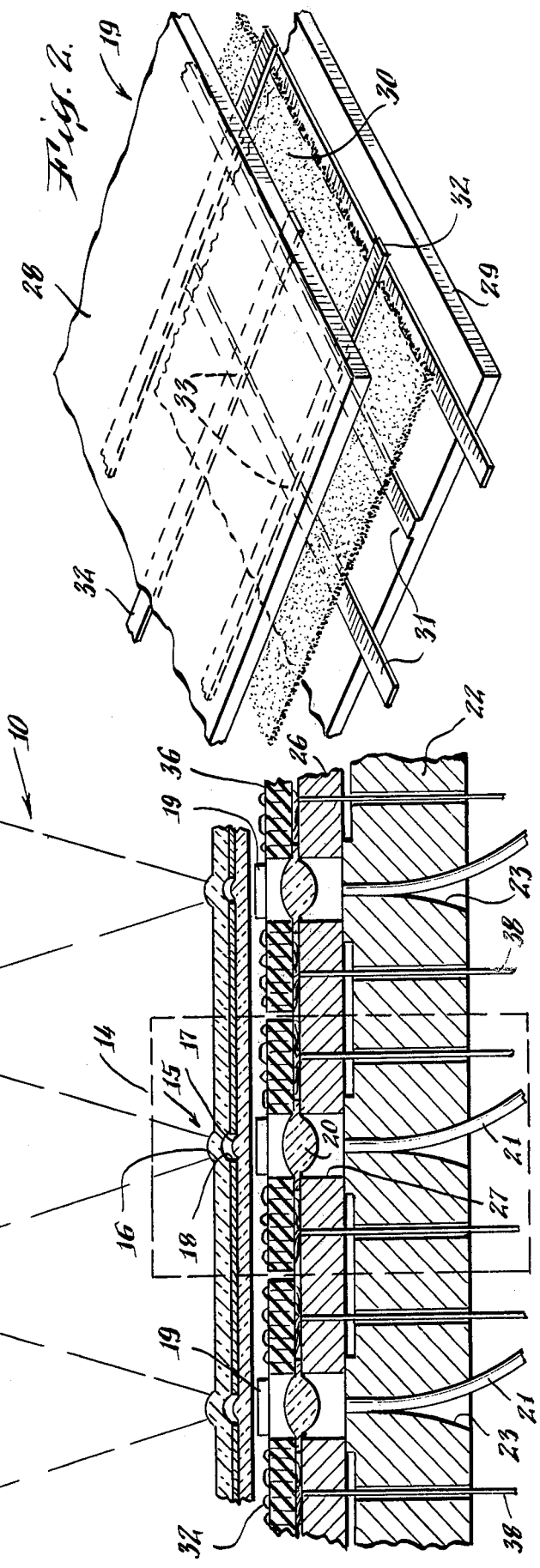

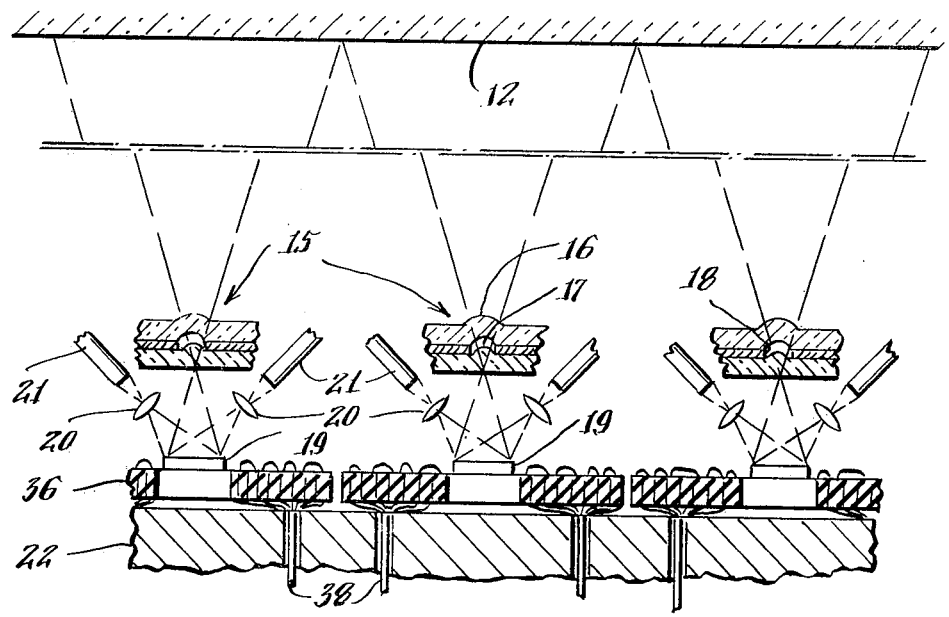
Fig. 5.
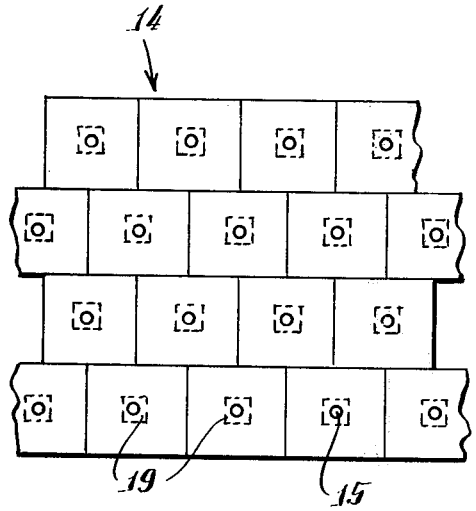
Fig. 4.
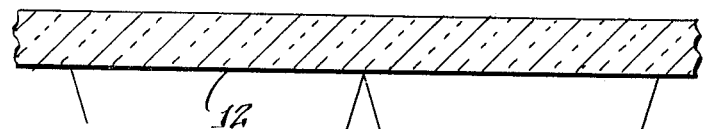
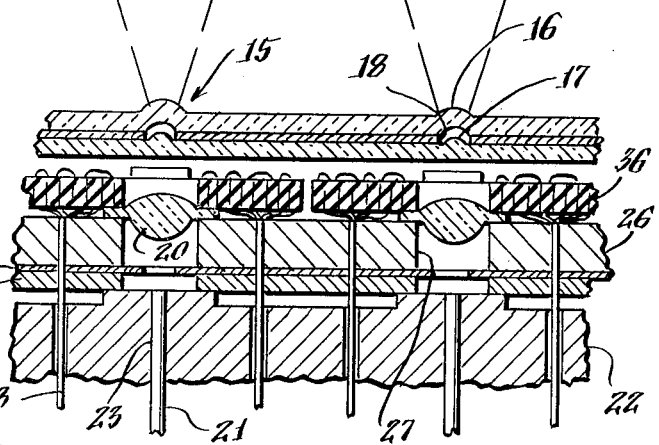
Fig. 6.
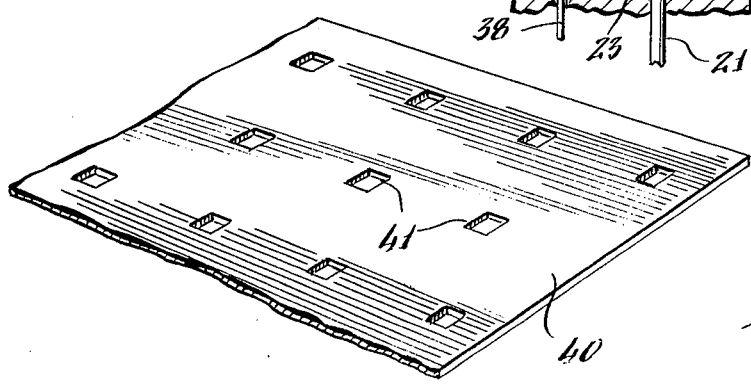
Fig. 7.

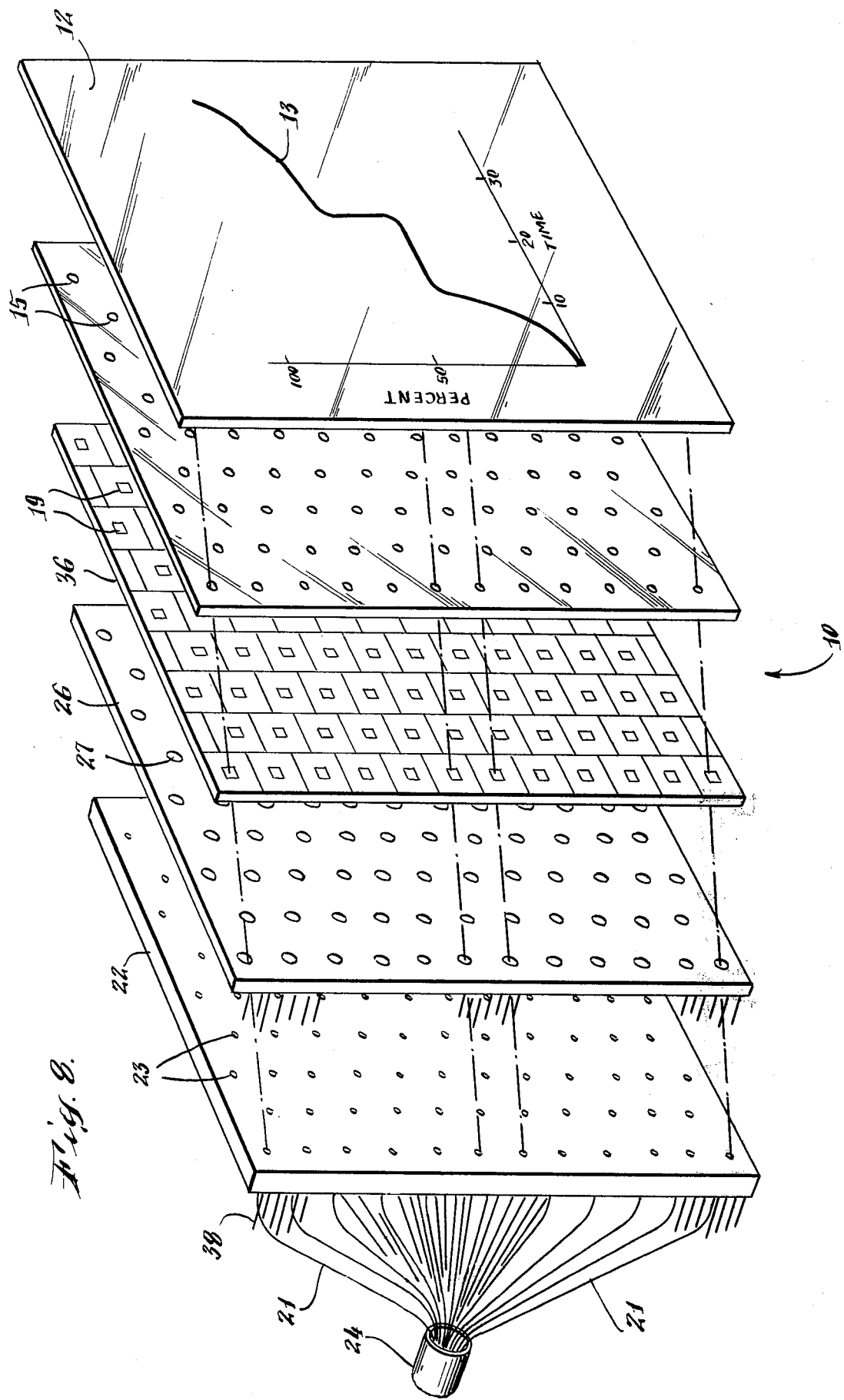

ELECTRO OPTICAL DISPLAY DEVICE

BACKGROUND OF THE INVENTION

This invention relates to electronically addressed displays which are capable of displaying alphanumeric, graphic and pictorial information translated from an electrical signal supplied to the display. Such displays are widely used with computer terminals, word processors, and other information handling equipment where it is desired to view electronically stored or transmitted information of an alphanumeric, graphic or a pictorial nature. More specifically, this invention relates to an electronically addressed electro optical display which is compact, relatively thin, portable and yet having a display size, resolution and contrast permitting the display of page sized, typewritten, alphanumeric, graphic and pictorial information.

The electronic display most widely used in conjunction with information handling equipment is the cathode ray tube. While the cathode ray tube possesses a number of well known advantageous features, it also possesses certain disadvantageous features which are more or less inherent in its basic design: for example, a cathode ray tube requires relatively high voltages in its operation, is susceptible to electromagnetic interference and is relatively bulky and heavy, thus limiting its portability. In addition, the cathode ray tube cannot be made economically in relatively large sizes, such as with a display area of 4 to 10 square feet. Finally, certain health hazards can be presented in the use of cathode ray displays. The Swedish Occupational Health and Safety Board has recommended that cathode ray tube terminal operators view them for only short periods to avoid eye strain and similar problems. X-ray radiation and implosion are other potential health hazards presented in connection with the use of cathode ray tube displays.

A variety of other display devices have been suggested. One class of such devices are the so called passive displays which operate by selectively modulating, in response to an electrical signal, the transmission, reflection, or scattering of light to create an image. Included in this class are, among others, liquid crystal devices, electrophoretic devices, and electrochromic devices. The other major class of electronically addressable displays are the so called active element displays which emit visible light in response to an electrical impulse to create an image. Included in this class are various types of gas discharge panels, electroluminescent panels, and the like. Limitations on the desirability of some types of active element displays have been their expense, including difficulty and expense of construction and relative bulkiness of units, including associated addressing circuitry, when made in sizes on the order of 9 inches by 12 inches or larger, which are those sizes commonly employed as information handling equipment terminal displays. Further limitations include monochromatic operation in colors unpleasing to and causing strain to the eye and, in some cases, high voltage operation and relatively poor resolution. The passive displays, usually in matrix form, have the advantage of relative thinness at least in small sizes and particularly in the case of liquid crystal devices, the advantage of low voltage, low power operation. In addition, such displays, particularly liquid crystals, have the capability of operation under high light level conditions. A major limitation on the use of passive displays has been an inability to scale up the size of such displays to current CRT terminal display sizes on the order of 9 inches by 12 inches or larger. A major reason for this limitation has been the expense and difficulty of fabricating 9 inch by 12 inch size or larger thin displays with 900 by 1200 line dot matrices with the associated electronic matrix address circuits required for such displays. In addition, enlarging the matrix shortens the life of certain of the passive displays, particularly when producing a display having a resolution capable of displaying typewritten size material. A possible solution to this problem would be the creation of a modular construction in which an array of passive display elements, for example, liquid crystals, would be employed. The difficulty with this solution by itself is that the separation lines between image bearing portions of the display element modules would, of necessity, be quite wide in order to provide space for the seal if necessary and the electronic addressing circuitry access. Such lines would substantially disfigure the image displayed and would diminish the amount and accuracy of information which could be displayed in such a display construction.

SUMMARY OF THE INVENTION

In accordance with one embodiment of the invention, an array of liquid crystal elements of the dot matrix type are arranged in a first plane and an optical system including an array of short focal length lenses are arranged in a second plane, parallel with the plane of the liquid crystal display elements, each display element being located on the optical axis of a respective one of the lenses. The lenses array magnifies and projects the images contained on the liquid crystal elements onto a rear projection screen with the images in overlapping relationship to create a unitary continuous image. As will be described more fully later, the image seen on the screen, due to the overlapping of the individual images projected from the display elements will be seen in a unitary continuous mode without visible division or separation lines on the screen. Further, since the array of lenses are of the short focal length type, the display is quite thin relative to its display size. Since the display is passive, an array of light sources illuminating each display element is provided. The matrix address circuitry for each cell as well as the seal for each cell and other non image bearing portions of the individual display elements are located on the periphery of the image bearing portion of the display element and out of the optical path of the array of lenses. Where the liquid crystal element is of the type which creates an image by modulating the transmission or scattering of light passing through it, the array of light sources is located on the opposite side of the display element from the projection lens and screen. In a second embodiment of the invention, the liquid crystal display elements are of the type which create an image by modulating the reflectance of light illuminating the element. In this embodiment, the array of light sources is located so that light creating the image is reflected from the display element to the projection lenses. In a third embodiment, an aperture mask is employed and the individual images from the display elements are projected onto the screen in edge butting relationship to create a unitary continuous image without apparent division lines.

BRIEF DESCRIPTION OF THE DRAWINGS

FIG. 1 is a section through a portion of a display device according to one embodiment of this invention.

FIG. 2 is a perspective view of a portion of an individual display element in a display device according to one form of this invention.

FIG. 3 is an enlarged plan view of an individual display element module according to one form of this invention.

FIG. 4 is a plan view of a portion of an array of the display element modules shown in FIG. 3.

FIG. 5 is a section similar to FIG. 1 of a display device according to a second embodiment of this invention, with portions thereof broken away.

FIG. 6 is a section similar to FIG. 1 of a display device according to a third embodient of this invention.

FIG. 7 is a perspective view of a portion of an aperture mask employed in the embodiment of FIG. 6.

FIG. 8 is an exploded perspective view of the device of FIG. 1.

DETAILED DESCRIPTION

Referring now to the drawings, particularly FIGS. 1–4 and 8, there is shown generally at 10 a display device according to one embodiment of this invention. Display device 10 includes a rear projection screen 12 on which is displayed an alphanumeric, and graphic and pictorial image 13 which is projected from an array of display element modules or subsections 14 arranged in a planar array parallel to and facing the plane of screen 12. Each display element module 14 includes a projection lens system 15 consisting of an upper lens element 16, a lower lens element 17 and an optical stop 18, which stop determines the f-number of the projection lens system. Arranged in a planar array which is parallel to the plane of the lens array is an array of liquid crystal display elements 19. Each liquid crystal display element is aligned with a respective one of the projected lenses and is located on the optical axis of and in the optical path of a respective one of the projection lenses. Each liquid crystal display element 19, in this embodiment of the invention, is of the type which forms an image by modulating the transmission or scattering of light passing through the element. Accordingly, each display element 19 is illuminated through a condenser lens 20 by an individual light conducting fiber light pipe 21. Light pipes 21 pass through retaining plate 22 containing retaining passages 23 and which retain the light pipes 21 in accurate optical alignment with the condenser lenses 20 for illuminating display elements 19. The light pipes 21 pass light received from a light source 24 as shown in FIG. 8. Condenser lenses 20 are mounted on a carrier plate 26 and in optical alignment with light passages 27 in plate 26.

Liquid crystal display elements 19 are of the dot matrix type and, as shown in FIG. 2, are constructed of a sandwich of transparent glass sheets 28 and 29 which retain therebetween a liquid crystal material layer 30. On the inner surfaces of sheets 28 and 29 are transparent electrical contact leads 31 and 32 which are typically formed of indium or tin oxide. Leads 31 and 32 are arranged in an X-Y matrix such that the intersection points 33 form a matrix of dots for dot matrix display element 19. Electrical signals containing information relating to the desired image are transmitted through leads 31 and 32 selectively activating portions of the liquid crystal material layer 30 at selected ones of the intersecting points or dots 33. Not shown, but used as part of the element 19 sandwich on the exterior surfaces of sheets 28 and 29 are polarizer and analyser sheets which, depending on their orientation, provide a light image on a dark background or a dark image on a light background upon activation of the liquid crystal material. Activation of liquid crystal material at points 33 causes the liquid crystal material to modulate the transmission, or scattering of light rays impinging on intersection points or dots 32, thereby creating the desired image.

For ease of interconnection, leads 31 and 32 may be made to exit in alternate fashion from both sides of liquid crystal sandwich display element 19 as shown in FIG. 2. Surrounding the periphery of each of liquid crystal display elements 19 is a hermetic seal 34 (FIG. 4) through which leads 31 and 32 exit. Surrounding peripheral seal 34 and mounting liquid crystal elements 19 is an electrically insulting support plate 36. Mounted on board 36 are electrical circuit elements 37 to which are connected leads 31 and 32. Circuit elements 37 form the electronic address for display elements 19 and electrical connection 38 with circuit elements 37 is made in a direction generally parallel to the optical axis of projection lenses 15, but out of the optical path from light pipes 21 to lenses 15 through plate 26 and retainer 22. It will be understood that a hybrid form of liquid crystal device may be employed in which a liquid crystal element 19 is mounted on a silicon element located on support plate 36 and containing the required electronic addressing circuitry.

It should be noted that only the dot matrix, image bearing portion of display element 19 is in the optical path from light pipe 21 to the projection lens 15 and that seal 34 and circuit elements 37 are external to the optical path to lens 15.

Referring more particularly to FIG. 4, it will be noted that display element modules 14 are arrayed such that the centers of each module through which the optical axes of lenses 15 pass, are located at the apices of equilateral triangles and separated from one another by a distance "a". By selection of distance "a" and design of lenses 15, the images from elements 19 are projected in overlapping fashion on screen 12 such that a unitary image 13 is reconstructed from the image segments on elements 19. Reference is made to U.S. Pat. No. 4,134,650, issued Jan. 16, 1979, and filed Mar. 4, 1977 in the name of Rosen for "Distributed Optical Microfiche Reader" and assigned to the assignee of the instant invention which describes such a projection technique and construction and which is incorporated herein by reference.

Referring now to FIG. 5, there is shown a second embodiment of the instant invention. In this embodiment, liquid crystal display element 19 is of the type which forms an image in response to an electrical signal by modulating its reflectance. Accordingly, light pipes 21 and condensers 20 are located on the screen side of elements 19 and light impinging on elements 19 and reflected therefrom is modulated to form an image on screen 12 when projected from element 19 through lenses 15 as described above.

In FIGS. 6 and 7, a third embodiment of this invention is shown in which a frame mask 40 having square apertures 41 is mounted above a spacer plate 42 on the fiber retaining sheet 22. Apertures 21 are located on the optical path between light pipes 21 and projection lenses 15. The size of aperture 21 and its location with respect to projection lenses 15 are selected such that images on display element 14 when projected on screen 12 are in butting relationship to form a unitary image 14 as shown in FIg. 8.

In the form of invention described herein, the liquid crystal display element includes 100 leads 31 and 100 leads 32 which form a matrix of 10,000 picture elements on each display element 19. The display element 19 is two tenths of an inch square while the distances -a- are one inch, as shown in FIG. 8, and array of 9×12 elements 14 is formed. Lenses 15 have a magnification of approximately 5 so while the screen 12 may be filled with a unitary and continuous image 13, space is provided contiguous to elements 19 for address circuitry 37 without disfiguring image 13. It will also be noted that a relatively thin display of approximately 4 inches is provided. Light pipes 21 and electrical connections 38 are located in a direction generally perpendicular to the optical axis of lens 15 but out of the optical path so as to provide a thinner display.

It will be understood that larger or smaller display devices as desired can be fabricated without departing from the invention and that dimensions different than those described can be employed Where a larger area display is desired, longer focal length projection lens may be employed. Alternatively, the number of element modules 14 can be increased. Further, while the use of a liquid crystal matrix display has been described, other types of displays such as electrochromic or electrophoretic displays or active element displays may also be employed. Where an active element display which emits light upon electrical actuation is employed, the light sources required in the passive display embodiment are omitted. While a two element projection lens system of the modified Petzval type has been shown, it will be understood that other single or multiple element projection lens systems 15 may be employed. It will also be understood that different color contrasting images can be achieved with liquid crystal elements 19 by employing various optical dyes.

What is claimed is:

1. An electro optical display device of the type in which an electrical signal is translated into alphanumeric, graphic and pictorial images comprising an array of individual projection lenses, each of said lenses being responsive to light of a different segment of said image, an array of electronically addressed electro optical display elements each of which is aligned with and on the optical axis of a respective one of the lenses, each of said elements being matrix addressable for formation of said segment of an image thereon, and a screen onto which said segments of the images on the display elements are assembled by projection by the lenses, said lenses being spaced from one another such that said assembled projection is without visible division.

2. A display device as set forth in claim 1, including a light source located for illuminating the array of display elements.

3. A display device as set forth in claim 2, wherein the light source includes an array of light conducting fiber rods for individually illuminating each of the display elements.

4. A display device as set forth in claim 1 wherein the lens array is in a first plane, the display elements are in a second plane, and the screen is in a third plane; the first, second, and third planes being substantially parallel with one another.

5. A display device as set forth in claim 1 wherein the electro optical display elements are dot matrix active display elements.

6. A display device as set forth in claim 1 wherein the display elements are dot matrix passive display elements.

7. A display device as set forth in claim 4 including electronic addressing means in electrical engagement with the display elements for supplying the display elements with an electrical signal to be translated into an image on the display elements.

8. A display device as set forth in claim 1 wherein the lenses magnify the images on the display elements when the images are projected on the screen.

9. A display device as set forth in claim 7 wherein at least a portion of the electronic addressing means are located on the second plane in interspersed relationship with the array of electro optical display elements and out of the optical paths of the projection lenses.

10. A display device as set forth in claim 6 wherein the display elements are of the type which create an image by modulating the transmission or scattering of light passing through the display element.

11. A display device as set forth in claim 6 wherein the display elements are of the type which create an image by modulating their reflectance of light impinging on the display element.

12. A display device as set forth in claim 8 in which the images on the display elements are projected onto the screen in overlapping relationship so as to provide a unitary continuous image on the screen.

13. A display device as set forth in claim 8 and further including a mask in the optical path of the projection lenses so that the images on the display elements are projected onto the screen in edge butting relationship so as to provide a unitary continuous image on the screen.

* * * * *